United States Patent
Wang

(10) Patent No.: US 10,819,983 B1
(45) Date of Patent: Oct. 27, 2020

(54) DETERMINING A BLURRINESS SCORE FOR SCREEN CAPTURE VIDEOS

(71) Applicant: Facebook, Inc., Menlo Park, CA (US)

(72) Inventor: Haixiong Wang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/589,934

(22) Filed: Oct. 1, 2019

(51) Int. Cl.
*H04N 19/154* (2014.01)
*G06K 9/00* (2006.01)
*G06K 9/46* (2006.01)
*H04N 19/513* (2014.01)
*G06T 7/13* (2017.01)

(52) U.S. Cl.
CPC ....... *H04N 19/154* (2014.11); *G06K 9/00711* (2013.01); *G06K 9/4604* (2013.01); *G06T 7/13* (2017.01); *H04N 19/513* (2014.11); *G06K 2009/4666* (2013.01)

(58) Field of Classification Search
None
See application file for complete search history.

(56) References Cited

U.S. PATENT DOCUMENTS

| | | | | |
|---|---|---|---|---|
| 8,437,548 | B2 * | 5/2013 | Kuma | G11B 27/28 382/173 |
| 2015/0109337 | A1 * | 4/2015 | Hofmann | G06T 19/006 345/633 |
| 2015/0156419 | A1 * | 6/2015 | Aggarwal | H04N 5/23222 348/208.1 |
| 2015/0242104 | A1 * | 8/2015 | Stokman | G11B 27/031 715/723 |
| 2015/0277638 | A1 * | 10/2015 | Bustamante | G06F 21/60 345/173 |
| 2018/0083978 | A1 * | 3/2018 | Pantazelos | H04W 12/06 |

* cited by examiner

*Primary Examiner* — Christopher G Findley
(74) *Attorney, Agent, or Firm* — FisherBroyles, LLP

(57) ABSTRACT

The disclosed computer-implemented method may include (1) receiving, from a video streaming service, a screen capture of a video playback session including one or more static visual elements and a video playing in the video playback session, (2) detecting a window within the screen capture containing the video playing in the video playback session, (3) selecting the window containing the video by excluding the static visual elements in the video playback session, (4) determining a blurriness score associated with a potential degradation in quality of the video playing in the selected window, and (5) providing the blurriness score for analysis. Various other methods, systems, and computer-readable media are also disclosed.

20 Claims, 8 Drawing Sheets

DETERMINING A BLURRINESS SCORE FOR SCREEN CAPTURE VIDEOS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
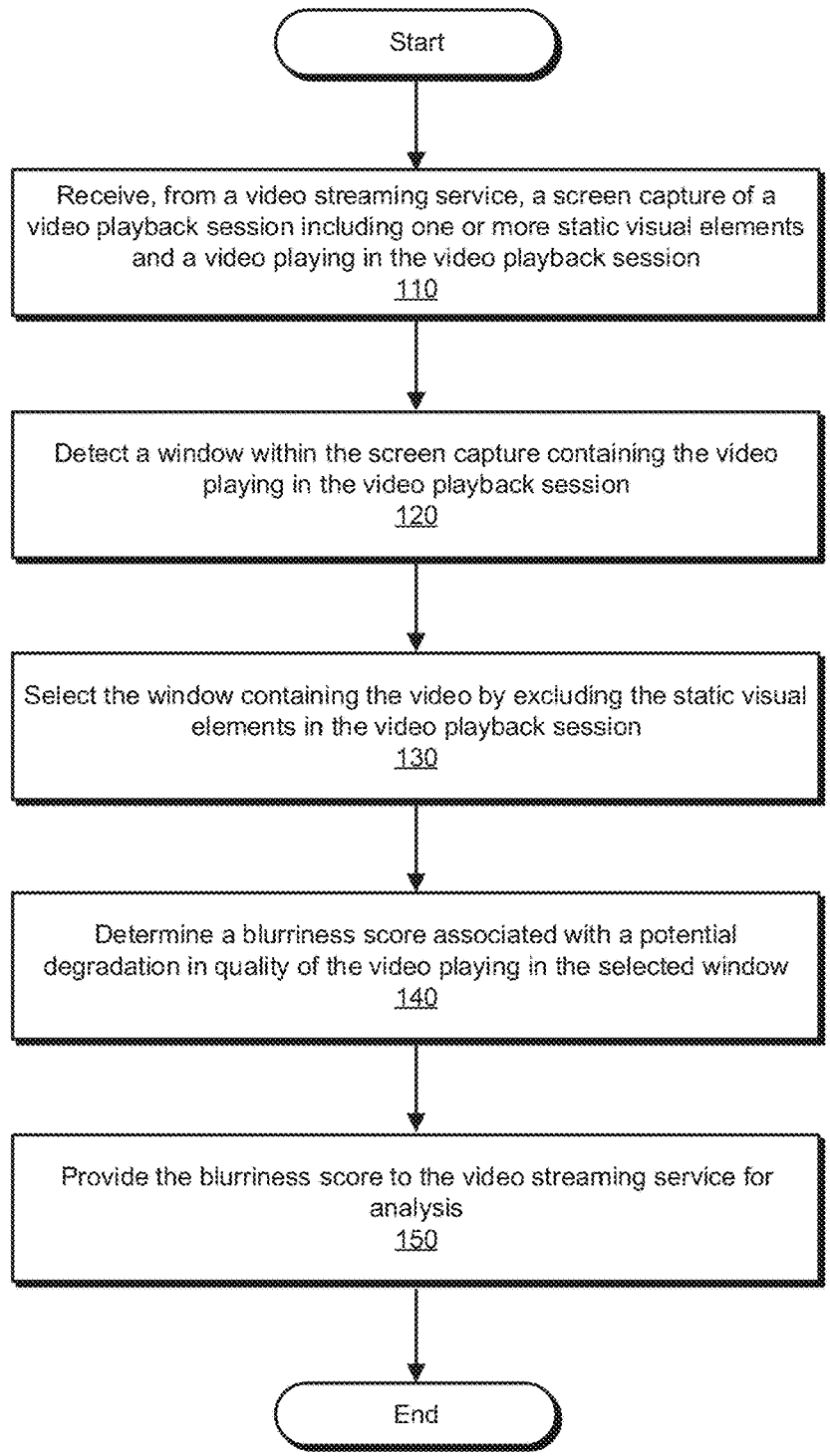
FIG. 1 is a flow diagram of an exemplary method for determining a blurriness score for screen capture videos.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Video streaming services are often utilized for providing a variety of media content to computing devices over a computing network for playback and/or sharing by end users. For example, a video streaming service may include a social media or video-sharing service that provides or real-time entertainment, music, or news videos for playback by users in a client application installed on a user computing device. In an effort to improve the playback experience of streamed content by end-users, a video streaming service provider may often evaluate the quality of the playback (e.g., at a pixel level) in a video streaming client application for a video that is publicly available across a number of other video streaming service providers, based on a variety of metrics. For example, a quality evaluation by a video streaming service may include recording a video playback session in a client application as a screen capture video to detect visual artifacts commonly seen in streaming videos for comparison with other video streaming services. Conventional techniques for performing quality evaluations based on screen capture videos, however, may often fail to accurately detect the visual artifacts needed to evaluate video pixel quality due to the visual impacts of extraneous user interface elements and/or text when videos are playing in a non-fullscreen mode in the client application.

The present disclosure provides systems and methods for (1) algorithmically detecting a video playing window within a screen capture of a playback session provided by a video streaming service and (2) detecting a blurriness of the video to determine a score (e.g., a blurriness score) associated with a potential degradation in the quality of the video. In some examples, the screen capture of the playback session may include various static visual elements in addition to the video playing window. In these examples, the static visual elements may include a variety of user interface (UI) elements (e.g., icons and/or text) that are displayed in the playback session and that are unhelpful in determining the blurriness score when the video is playing in a non-fullscreen mode on the video streaming service.

The disclosed systems and methods may detect the video playing window within the screen capture such that the UI elements are excluded based on motion vector values calculated by (1) scanning a group of video frames in the video for pixels and (2) utilizing the motion vector values to determine a starting location of a rectangular area defining the video playing window. The disclosed systems and methods may further detect the blurriness score for the video based on (1) applying an edge detection algorithm on the group of video frames in the video to measure an average thickness of the video frame edges and (2) assigning a value representing the blurriness score for the video based on the average edge thickness (e.g., a large average edge thickness would result in a high blurriness score).

By detecting the video playing window of a video within a screen capture by excluding unhelpful UI elements that may impact the determination of blurriness scores, the present disclosure may provide a more accurate evaluation of video pixel quality for videos in playback sessions on a video streaming service as opposed to conventional techniques where the visual impact of the UI elements may negatively affect similar evaluations. The present disclosure may further improve the functioning of a computer itself by improving the computer's ability to evaluate the quality of video playback sessions in video streaming applications. The present disclosure may additionally improve the technical field of video streaming by providing blurriness scores determined from video playback sessions for analysis by video streaming services such that the quality of future video playback sessions may be improved.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIG. 1, detailed descriptions of computer-implemented methods for determining a blurriness score for screen capture videos. Detailed descriptions of corresponding example systems will also be provided in connection with FIGS. 2-3. Detailed descriptions of corresponding screen capture videos will be provided in connection with FIGS. 4-8.

FIG. 1 is a flow diagram of an exemplary computer-implemented method 100 for determining a blurriness score for screen capture videos. The steps shown in FIG. 1 may be performed by any suitable computer-executable code and/or computing system, including the system illustrated in FIGS. 2-3. In one example, each of the steps shown in FIG. 1 may represent an algorithm whose structure includes and/or is represented by multiple sub-steps. In one embodiment, the steps shown in FIG. 1 may be performed by modules stored in a memory of a computing system and/or operating within a computing device. For example, the steps shown in FIG. 1 may be performed by modules 202 stored in a memory 240 of a computing system further including a data storage 220 and a physical processor 230 (e.g., as shown in exemplary system 200 in FIG. 2) and/or modules operating in a server 302 (e.g., as shown in exemplary system 300 in FIG. 3) and/or modules operating in a user device 306.

Data storage 220 generally represents any type or form of machine-readable medium capable of storing information. In one example, data storage 220 may store information utilized in determining a blurriness score for screen capture videos.

Server 302 generally represents any type or form of backend computing device that may perform one or more functions directed at determining a blurriness score for screen capture videos. In some examples, server 302 may provide video streaming services in conjunction with social networking functions as part of a social networking platform that manages server 302. Although illustrated as a single entity in FIG. 3, server 302 may include and/or represent a group of multiple servers that operate in conjunction with one another.

User device 306 generally represents any type or form of computing device capable of reading computer-executable instructions. For example, user device 306 may represent a smart phone and/or a tablet. Additional examples of user device 306 may include, without limitation, a laptop, a desktop, a wearable device, a personal digital assistant (PDA), etc. In some examples, user device 306 may display a video playback session 312 (including streaming video) that is recorded as a screen capture by server 302 over a network 304.

Network 304 generally represents any medium or architecture capable of facilitating communication or data transfer. In one example, network 304 may facilitate communication between server 302 and user device 306. In this example, network 304 may facilitate communication or data transfer using wireless and/or wired connections. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 2:
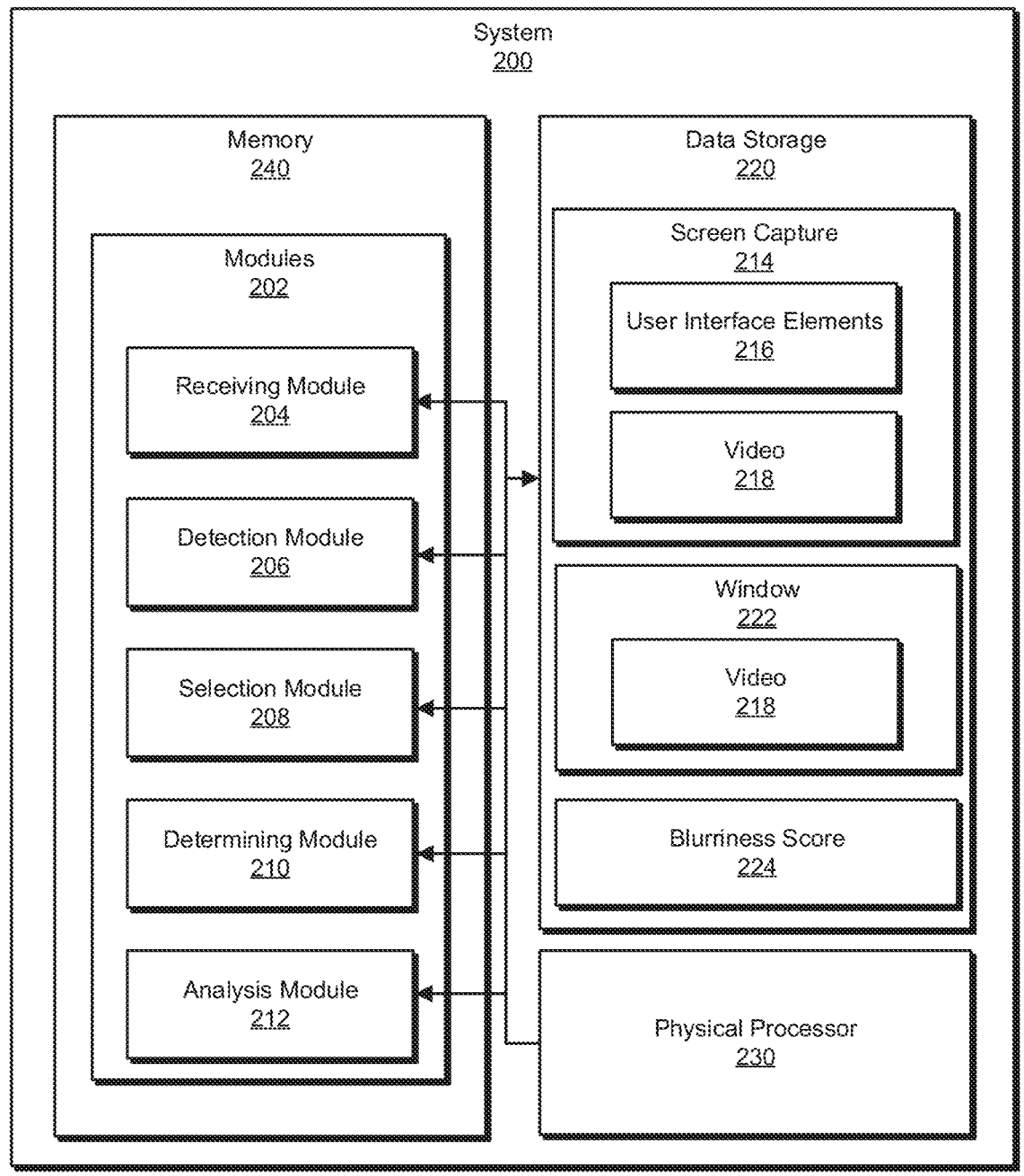
FIG. 2 is a block diagram of an exemplary system for determining a blurriness score for screen capture videos.
Figure 3:
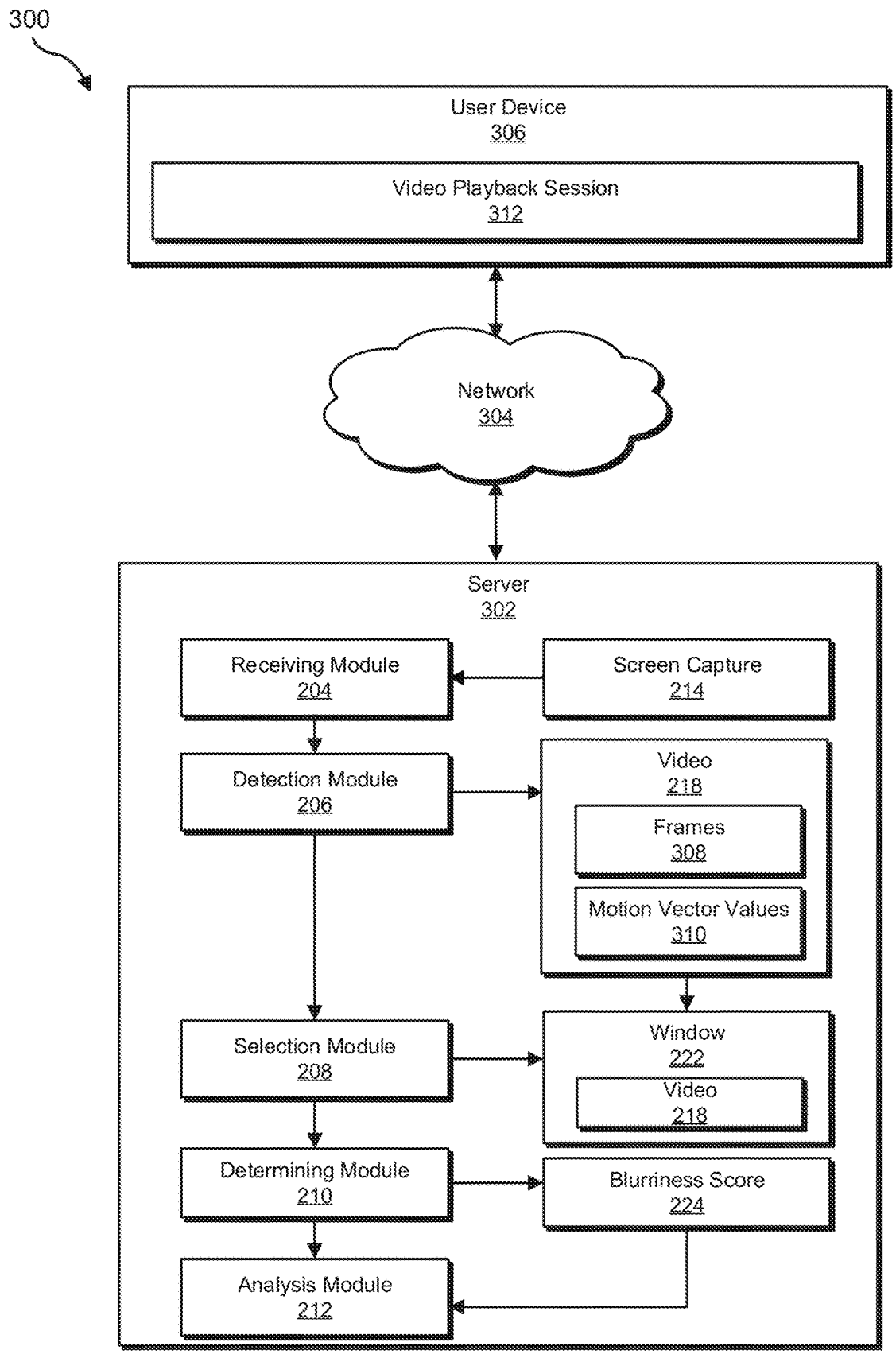
FIG. 3 is a block diagram of an additional exemplary system for determining a blurriness score for screen capture videos.

Returning to FIG. 1, at step 110, one or more of the systems described herein may receive, from a video streaming service, a screen capture of a video playback session including one or more static visual elements and a video playing in the video playback session. For example, as illustrated in FIGS. 2-3, a receiving module 206 may receive screen capture 214 that includes video playback session 312 for a video 218.

In some examples, the term "screen capture" may refer to any type or form of a recording corresponding to a video playback session on a user device (e.g., user device 306). For example, a screen capture may be a digital recording of a computing device screen output (e.g., a still image capture of a screen containing video content) utilizing software and/or hardware configured to record and compress video on a separate computing device than the one generating the video content being captured. In these examples, the still image capture may be saved as a file corresponding to a variety of image file types including, without limitation, a Joint Photographic Group Experts Group (JPEG) file type, a Tagged Image File Format (TIFF) file type, a Portable Network Graphics (PNG) file type, etc. In some examples, pixel information for each of a number of pixels in the portion of the screen containing the video content may also be saved in the still image capture file.

In some examples, a screen capture may include a recording of video playback session 312 on user device 306 that is initiated by server 302. In these examples, the recording may include video 218 well as various static visual elements (e.g., user interface elements 216) displayed within a video streaming application on user device 306.

Receiving module 204 may receive screen capture 214 in a variety of ways. In some embodiments, receiving module 204 may record video playback session 312 on user device 306 when video 218 is playing in a non-fullscreen mode on a video streaming service. In some examples, the term "non-fullscreen mode" may refer to a video playback session embedded within a window of a user interface generated by a video streaming application including additional user interface elements and/or text outside of the window. For example, a video steaming application provided by a social networking platform may include an embedded window for a video playback session of a news program within a user post including comments, reaction icons, playback statistics, etc.

In some examples, the non-fullscreen mode may include a playback of video 218 in a portrait mode within a video streaming application providing video playback session 312 on user device 306. In other examples, the non-fullscreen mode may include a playback of video 218 in a landscape mode within the video streaming application.

Figure 4:
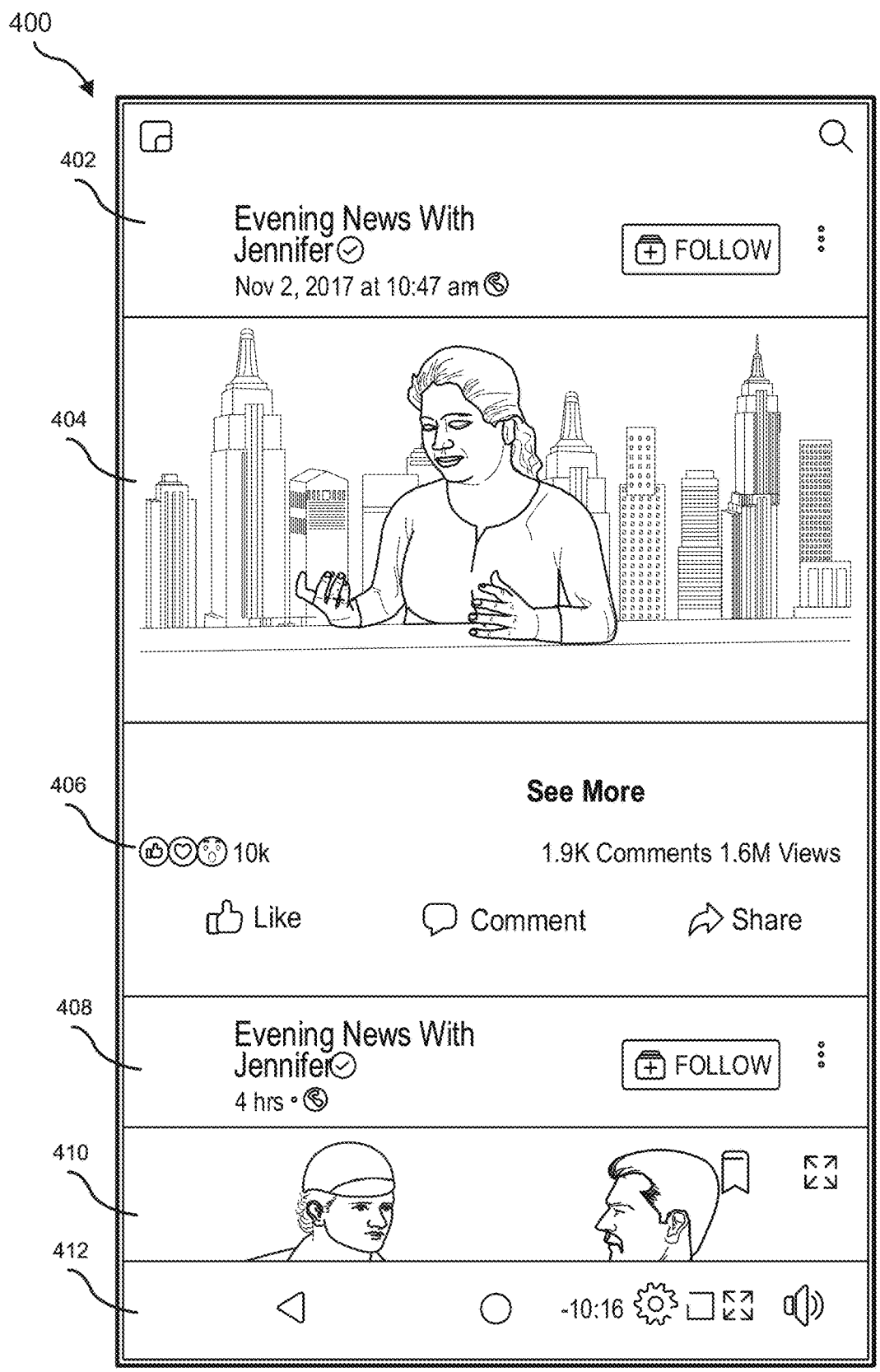
FIG. 4 is an illustration of an exemplary input screen capture of a video playback session in a user interface of a video streaming service application.

FIG. 4 provides an exemplary illustration of a screen capture 400 of a video playback session corresponding to screen capture 214. As shown in FIG. 4, screen capture 400 includes a video playing area 404 and non-video playing areas 402, 406, 408, 410, and 412, all of which are recorded in screen capture 400. Video playing area 404 includes a playback of a streaming video (e.g., video 218) and non-video playing areas 402, 406, 408, 410, and 412 includes various user interface elements (e.g., user interface elements 216) representing visual elements designed to provide information and/or enable users to interact with various aspects of the video playback session (e.g., on a social networking platform). For example, non-video playing areas 402, 406, 408, 410, and/or 412 may include text describing or identifying a video playing in video playing area 404 (e.g., "Evening News With Jennifer"), time/date information, and visual elements (e.g., buttons) enabling a user to receive/provide status updates (e.g., comments, views etc.), reactions (e.g., "Like", "Love", "Wow", etc.), control icons (e.g., rewind, stop, volume, settings, increase/decrease window size, etc.), "Share", and/or "Follow", with respect to the video.

Returning to FIG. 1, at step 120, one or more of the systems described herein may detect a window within the screen capture containing the video playing in the video playback session. For example, as illustrated in FIG. 2, a detection module 206 may detect a window 222 containing video 218.

Detection module 206 may detect window 222 in a variety of ways. For example, as illustrated in FIG. 3, in some embodiments, detection module 206 may perform a scan (e.g., a raster scan) each of a group of frames 308 in video 218 for one or more rows of pixels making up a frame image. Detection module 206 may then calculate, during the scanning of frames 308, a motion vector value 310 associated with each of the pixels. In some examples, detection module 206 may calculate motion vector values 310 by calculating a length of a motion vector associated with each of the pixels for a frame 308 and then determine motion vector value 310 based on the calculated length.

Detection module 206 may then determine that a motion vector value 310 for a frame 308 is above a threshold value (e.g., 0). In some examples, detection module 206 may discontinuing the scanning of frames 308 upon determining that a motion vector value 310 is above the threshold value. Next, detection module 206 may record a row value for each of frames 308 based on their associated motion vector values 310. Detection module 206 may then sort each recorded row value for frames 308 as a series of integer values. Finally, detection module 206 may select a median value from the series of integer values corresponding to a starting location of a rectangular area defining window 222. For example, for a 720×1080 pixel screen capture video (e.g., 720 rows of pixels by 1080 columns of pixels), an output of detection module 206 may be a starting row integer number indicating that the location of the top-left corner of the rectangular area defining window 222 is at row 108.

In some examples, the term "motion vector" may refer to a representation of a pixel utilized to store changes to an image as numerical values from one frame to the next (e.g., adjacent frames) in a video sequence. Changes in these numerical values between frames represent an estimate of motion in the video sequence. For example, a motion vector value for a pixel location in a reference video frame that is different than a motion vector value for the same pixel in an adjacent video frame may indicate movement of one or more objects between these two frames in a video sequence.

Returning to FIG. 1, at step 130, one or more of the systems described herein may select the window containing the video by excluding the static visual elements in the video playback session. For example, as illustrated in FIG. 3, a selection module 208 may select window 222 by excluding user interface elements 216.

Selection module 208 may select window 222 in a variety of ways. For example, selection module 208 may select window 222 by cropping an area in screen capture 214 containing user interface elements 216 and thereby leaving only video 218. In some examples, selection module 208 may exclude a variety of user interface elements 216 by selecting window 222 in screen capture 216. In these examples, excluded user interface elements 216 may various visual elements designed to provide information and/or enable users to interact with various aspects of the video playback session (e.g., on a social networking platform). These visual elements may include, without limitation, text describing or identifying video 222, time/date information, status icons (e.g., comments, views, etc.), icons enabling a user to express reactions (e.g., "Like", "Love", "Wow", etc.), and video control elements (e.g., rewind, stop, volume, settings, increase/decrease window size, etc.).

Figure 5:
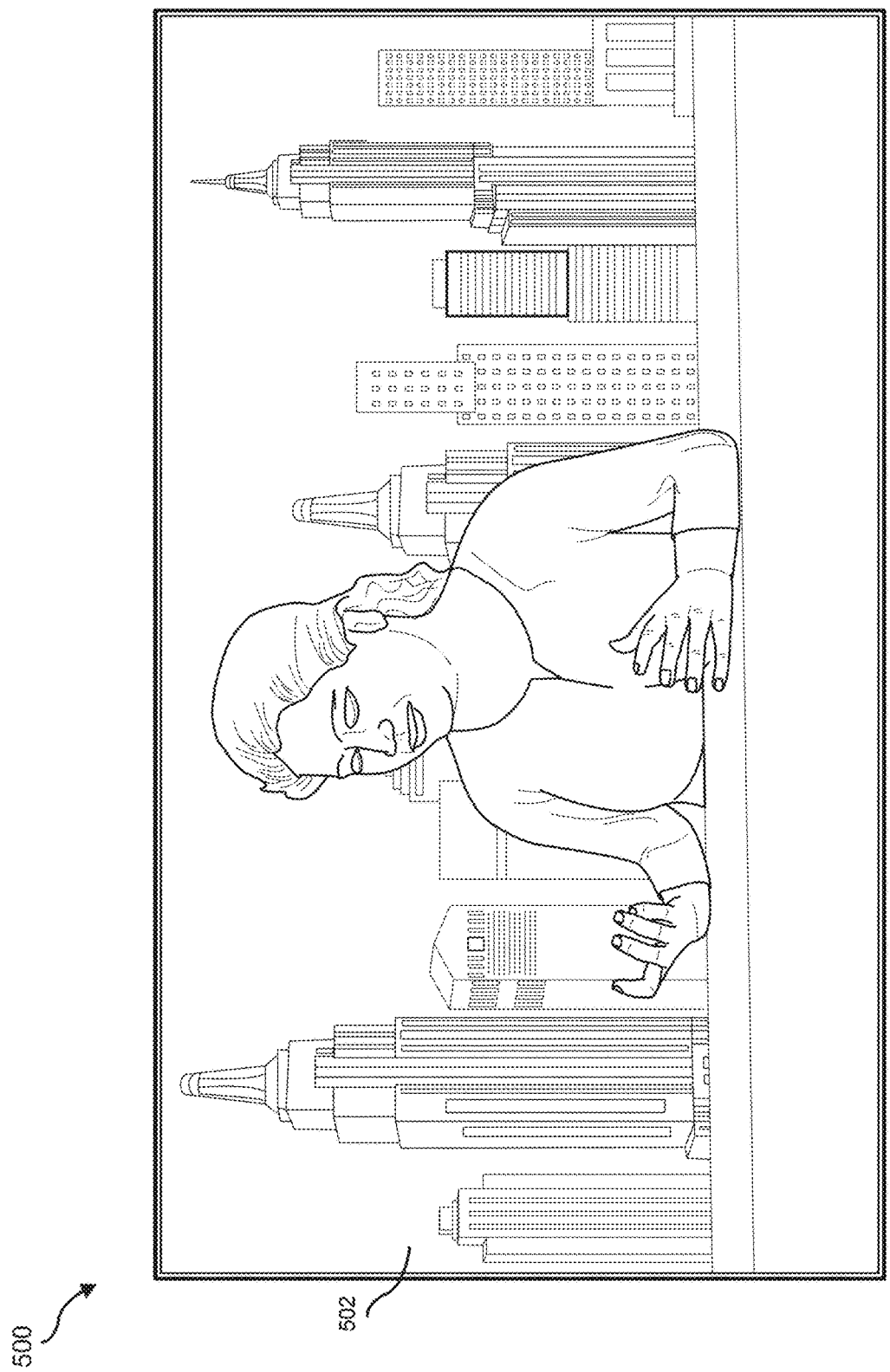
FIG. 5 is an illustration of an exemplary output screen capture of a cropped video from the video playback session included in the user interface depicted in FIG. 4.

FIG. 5 provides an exemplary illustration of a selected window 500 from a screen capture corresponding to window 222 of FIG. 3. As shown in FIG. 5, window 500 only includes a video 502 while the remaining portion of the original screen capture (e.g., user interface elements 216) have been cropped.

Returning to FIG. 1, at step 140, one or more of the systems described herein may determine a blurriness score associated with a potential degradation in quality of the video playing in the selected window. For example, as illustrated in FIG. 3, a determining module 210 may determine a blurriness score 224 associated with a potential degradation in quality of video 218 in window 222. In some examples, the term "degradation" may refer to various video distortion types such as blurring or other artifacts (e.g., ringing, contouring, blockiness, aliasing, etc.) that may be caused by lossy data compression, dropped packets, lower resolution playback etc., during a video playback session provided by a video streaming provider.

In some examples, the term "blurriness score" may refer to any information (e.g., a numerical value) that represents the degree to which a sequence of frames, such as in a video, may be clearly distinguished by a viewer. An example blurriness score may include, without limitation, a numerical value representing the degree to which the edges of frames making up a video have thickened beyond a distinct outline.

Determining module 210 may determine blurriness score 224 in a variety of ways. For example, determining module 210 may utilize an edge detection algorithm to determine the thickness of frames 308 in video 218. In this example, determining module 210 may detect an average edge thickness for frames 308 and then assign a numerical value representing blurriness score 224 for video 218 based on the average edge thickness.

In some examples, determining module 210 may detect the average edge thickness by (1) detecting a target edge for each of frames 308, (2) determine a thickness of the detected target edge, (3) detect subsequent target edges for each of frames 308, (4) determining a thickness of the subsequent detected target edges, and (5) averaging the thickness of all of the detected target edges to detect the average edge thickness for all frames 308 in video 218.

In some examples, blurriness score 224 may be a value utilized for determining an amount of degradation in the quality of video 218 in window 222 based on a corresponding range of numerical values (e.g., from 0 to 100 or from 100 to 0). For example, a blurriness score 224 of 80 may indicate a high degree of pixel quality degradation in video 218 while a blurriness score 224 of 20 may indicate a low degree of pixel quality degradation in video 218. Alternatively, a blurriness score 224 of 80 may indicate low degree of pixel quality degradation in video 218 while a blurriness score 224 of 20 may indicate a high degree of pixel quality degradation in video 218.

In some examples, the term "pixel quality degradation" may refer to video distortion (e.g., blurring) that is based on a decreased number of pixels (i.e., a set of physical points or picture elements) for an image in one or more of several frames making up a video as compared to an original image. An example of pixel quality degradation may include a reduced number of pixels in an image shown in one or more frames of a video, thereby resulting in the image appearing blurred.

Figure 6:
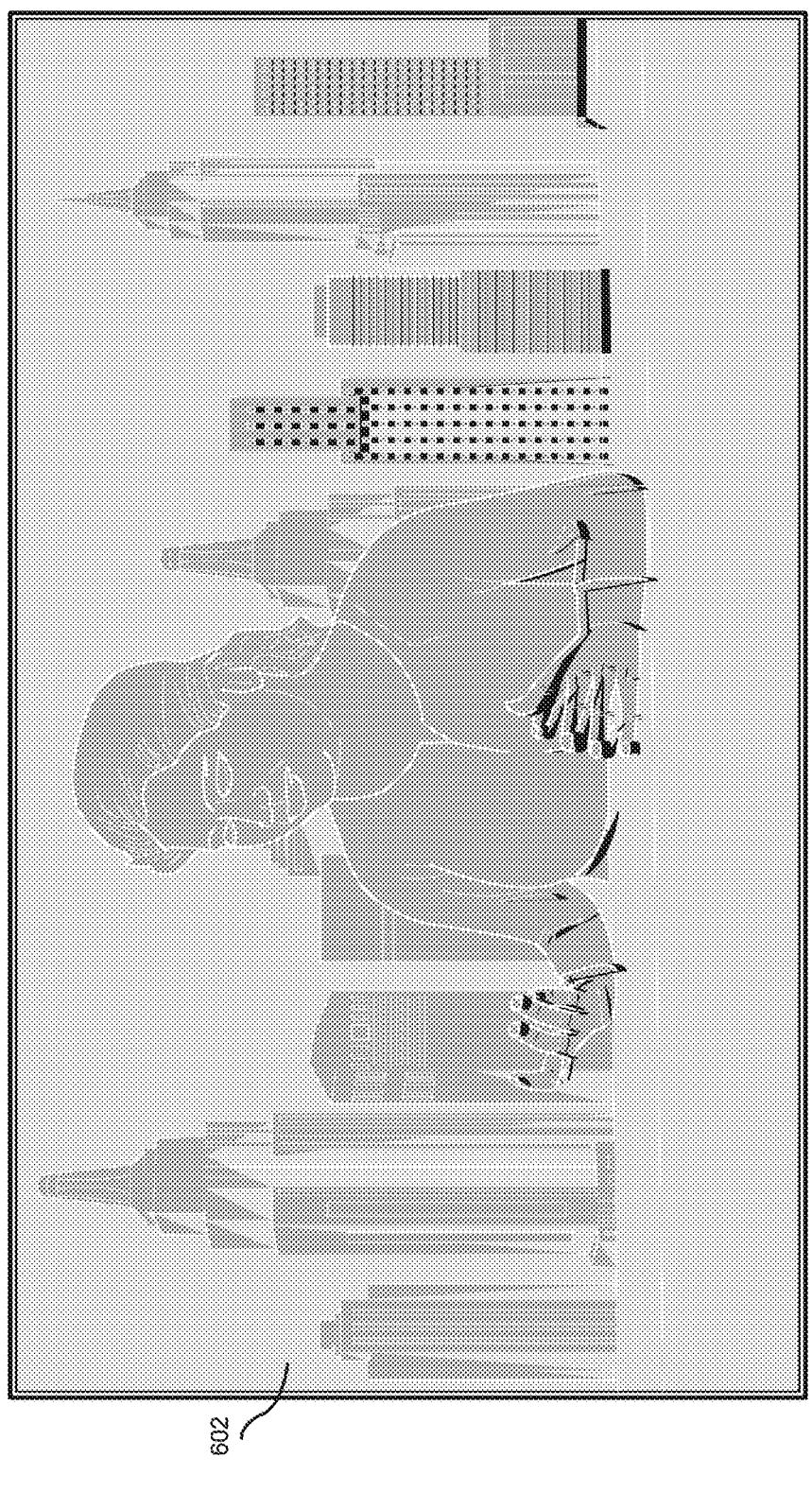
FIG. 6 is an illustration of an exemplary output of blur detection for the cropped video depicted in FIG. 5.
Figure 7:
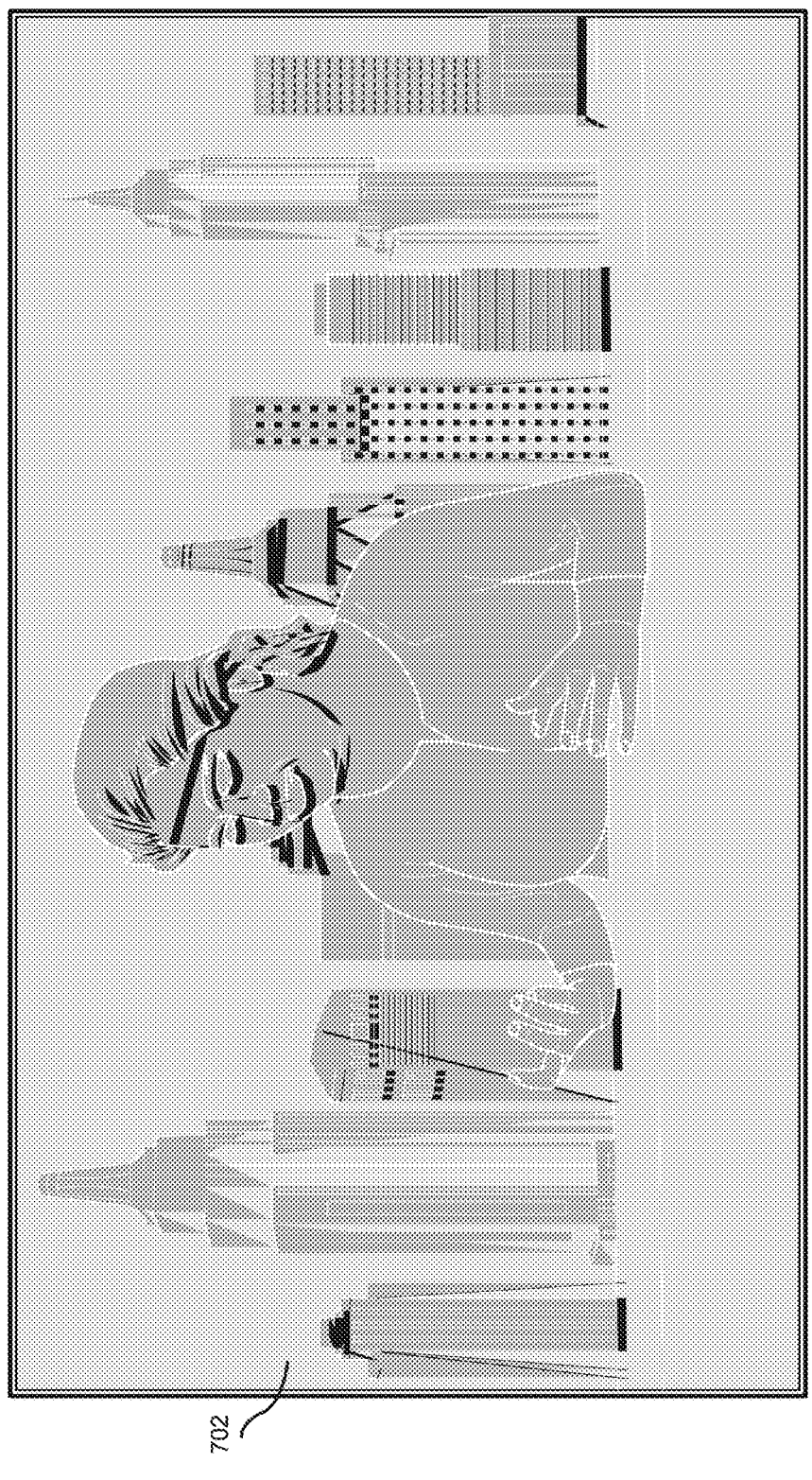
FIG. 7 is an illustration of an additional exemplary output of blur detection for the cropped video depicted in FIG. 5.
Figure 8:
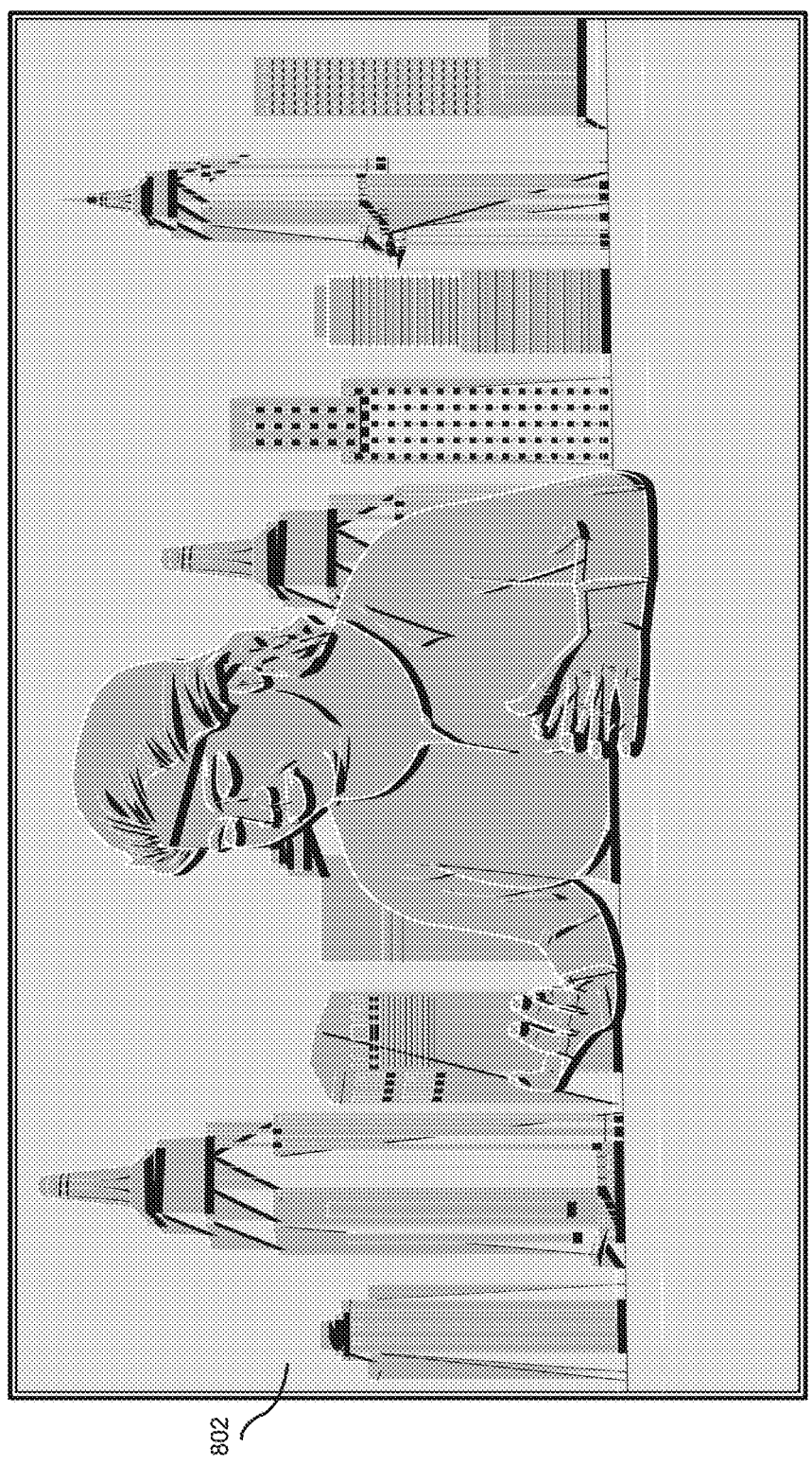
FIG. 8 is an illustration of another exemplary output of blur detection for the cropped video depicted in FIG. 5.

FIGS. 6-8 provide exemplary illustrations of varying degrees of blurriness associated with pixel quality degradation for a video in a video playback session. In some examples, the exemplary illustrations of FIGS. 6-8 may represent an output of the edge detection algorithm utilized by determining module 210 to determine blurriness score 224, as described above in step 140 of FIG. 1.

For example, as shown in FIG. 6, a video 602 has a low degree of blurriness due to pixel artifacts (e.g., thick edges) primarily occurring around the hands of the human figure. Thus, for video 602, determining module 210 may determine a low value (e.g., 20) for blurriness score 224 based on the output of the edge detection algorithm. In some examples, the edge detection algorithm may be a machine-learning computer vision algorithm configured to perform a variety of tasks including analyzing video images (e.g., frames) to identify distortion by detecting and measuring the thickness of edges in the frames. For example, an edge detection algorithm may identify a video image as a set of pixels and utilize a filter to detect the edges (e.g., image boundaries) for various objects in the image. The algorithm may then determine whether a pixel is an edge pixel by looking at a neighborhood of surrounding pixels having a size corresponding to an edge detection template. The algorithm may then calculate a discrete convolution to classify a candidate pixel as an edge pixel when a threshold associated with the template is exceeded and is a local maximum.

As shown in FIG. 7, a video 702 has a medium degree of blurriness due to thick edges occurring primarily around both the head of the human figure and in a few of the buildings in the background. Thus, for video 702, determining module 210 may determine a medium value (e.g., 50) for blurriness score 224 based on the output of the edge detection algorithm.

As shown in FIG. 8, a video 802 has a high degree of blurriness due to thick edges occurring around the head, torso, and hands of the human figure and in several of the buildings in the background. Thus, for video 802, determining module 210 may determine a high value (e.g., 90) for blurriness score 224 based on the output of the edge detection algorithm.

Returning to FIG. 1, at step 150, one or more of the systems described herein may provide the blurriness score determined at step 140 to a video streaming service for analysis. For example, as illustrated in FIG. 3, an analysis module 212 provide blurriness score 224 to a video streaming service providing video playback session 312 on user device 306.

In some examples, analysis module 212 may be utilized to perform the analysis of blurriness score 224 after it has been provided to the video streaming service. Analysis module may perform the aforementioned analysis in a variety of ways. In some examples, analysis module 212 may compare blurriness score 224 for the video streaming service to a previously detected blurriness score for video 218 from a video playback session on another video streaming service and then determine, based on the comparison of blurriness scores, that video 218 has a lower, similar, or higher pixel quality than video 218 in the video playback session on the other video streaming service. For example, analysis module 212 may, for a video streaming service provided by a social networking platform, perform an analysis of a news video provided on its platform as well as on a competing video streaming service provided another social networking platform and/or a video sharing service platform. Analysis module 212 may then provide the results of the analysis to the video streaming service so that it may its performance against its competitors. For example, as a result of the analysis, the video streaming service may take steps to improve the quality of videos that it provides based on videos provided by a competing video streaming service having a higher pixel quality.

As explained in connection with method 100 above, the systems and methods described herein provide for the detection of a video playing window of a video within a screen capture by excluding the visual impact of unhelpful UI elements when the video is playing in non-fullscreen mode. A first step may include detecting a rectangular playing window (e.g., a cropped area) within a screen capture by utilizing a detection algorithm based on reading motion vector values during a video decoding stage. Then, an edge-based detection algorithm may be utilized to detect the blurriness of the cropped area. The edge-based detection algorithm may calculate blurriness by measuring the thickness of detected edges.

EXAMPLE EMBODIMENTS

Example 1

A computer-implemented method comprising: receiving, by a computing device and from a video streaming service, a screen capture of a video playback session comprising one or more static visual elements and a video playing in the video playback session; detecting, by the computing device, a window within the screen capture containing the video playing in the video playback session; selecting, by the computing device, the window containing the video by excluding the static visual elements in the video playback session; determining, by the computing device, a blurriness score associated with a potential degradation in quality of the video playing in the selected window; and providing, by the computing device, the blurriness score for analysis.

Example 2

The computer-implemented method of example 1, wherein detecting the window within the screen capture containing the video playing in the video playback session comprises: scanning each of a plurality of frames in the video for one or more rows of pixels comprising a frame image; calculating, during the scanning of each of the plurality of frames, a motion vector value associated with each of the pixels; determining that the motion vector value is above a threshold value; recording a row value for each of the plurality of frames based on the motion vector value; sorting each recorded row value for the plurality of frames as a series of integer values; and selecting a median value from the series of integer values corresponding to a starting location of a rectangular area comprising the window within the screen capture containing the video.

Example 3

The computer-implemented method of example 2, further comprising discontinuing the scanning of each of the plurality of frames upon determining that the motion vector value is above the threshold value.

Example 4

The computer-implemented method of any of examples 2 or 3, wherein calculating the motion vector value associated with each of the pixels comprises: calculating a length of a motion vector associated with each of the pixels; and determining the motion vector value based on the length.

Example 5

The computer-implemented method of any of examples 1-4, wherein selecting the window containing the video comprises cropping an area in the screen capture containing the static visual elements.

Example 6

The computer-implemented method of any of examples 1-5, wherein determining the blurriness score comprises: detecting an average edge thickness for a plurality of frames in the video playing in the selected window; and assigning a value representing the blurriness score for the video based on the average edge thickness.

Example 7

The computer-implemented method of example 6, wherein detecting the average edge thickness for the plurality of frames in the video playing in the selected window comprises: detecting a target edge for each of the plurality of frames; determining a thickness of the detected target edge; detecting another target edge for each of the plurality of frames; determining a thickness of the another detected target edge; and averaging the thickness of at least the detected target edge and the thickness of the another detected target edge to detect the average edge thickness.

Example 8

The computer-implemented method of any of examples 1-7, wherein the analysis comprises: comparing the blurriness score to a previously detected blurriness score for the video from a video playback session on another video streaming service; and determining, based on the blurriness score, that the video in the video playback session on the video streaming service has a lower pixel quality than the video in the video playback session on the another video streaming service.

Example 9

The computer-implemented method of any of examples 1-8, wherein one or more static visual elements comprises one or more user interface elements displayed in the video playback session when the video is playing in a non-fullscreen mode on the video streaming service.

Example 10

A system comprising: at least one physical processor; physical memory comprising computer-executable instructions that, when executed by the physical processor, cause the physical processor to: receive, by a receiving module stored in the memory, screen capture of a video playback session from a video streaming service, the screen capture comprising one or more static visual elements and a video playing in the video playback session; detect, by a detection module stored in the memory, a window within the screen capture containing the video playing in the video playback session; select, by a selection module stored in the memory, the window containing the video by excluding the static visual elements in the video playback session; determine, by a determining module stored in the memory, a blurriness score associated with a potential degradation in quality of the video playing in the selected window; and provide, by an analysis module stored in the memory, the blurriness score for analysis.

Example 11

The system of example 10, wherein the detection module detects the window within the screen capture containing the video playing in the video playback session by: scanning each of a plurality of frames in the video for one or more rows of pixels comprising a frame image; calculating, during the scanning of each of the plurality of frames, a motion vector value associated with each of the pixels; determining that the motion vector value is above a threshold value; recording a row value for each of the plurality of frames based on the motion vector value; sorting each recorded row value for the plurality of frames as a series of integer values; and selecting a median value from the series of integer values corresponding to a starting location of a rectangular area comprising the window within the screen capture containing the video.

Example 12

The system of example 11, wherein the detection module further detects the window within the screen capture containing the video playing in the video playback session by discontinuing the scanning of each of the plurality of frames upon determining that the motion vector value is above the threshold value.

Example 13

The system of any of examples 11 or 12, wherein the detection module calculates the motion vector value associated with each of the pixels by: calculating a length of a motion vector associated with each of the pixels; and determining the motion vector value based on the length.

Example 14

The system of any of examples 10-13, wherein the selection module selects the window containing the video by cropping an area in the screen capture containing the static visual elements.

Example 15

The system of any of examples, 10-14, wherein the determining module determines the blurriness score by: detecting an average edge thickness for a plurality of frames in the video playing in the selected window; and assigning a value representing the blurriness score for the video based on the average edge thickness.

Example 16

The system of example 15, wherein the determining module detects the average edge thickness for the plurality of frames in the video playing in the selected window by: detecting a target edge for each of the plurality of frames; determining a thickness of the detected target edge; detecting another target edge for each of the plurality of frames; determining a thickness of the another detected target edge; and averaging the thickness of at least the detected target edge and the thickness of the another detected target edge to detect the average edge thickness.

Example 17

The system of any of examples 10-16, wherein the analysis comprises: comparing the blurriness score to a previously detected blurriness score for the video from a video playback session on another video streaming service; and determining, based on the blurriness score, that the video in the video playback session on the video streaming service has a lower pixel quality than the video in the video playback session on the another video streaming service.

Example 18

The system of any of examples 10-17, wherein the one or more static visual elements comprises one or more user interface elements displayed in the video playback session when the video is playing in a non-fullscreen mode on the video streaming service.

Example 19

A non-transitory computer-readable medium comprising one or more computer-executable instructions that, when executed by at least one processor of a computing device, cause the computing device to: receive, from a video streaming service, a screen capture of a video playback session comprising one or more static visual elements and a video playing in the video playback session; detect a window within the screen capture containing the video playing in the video playback session; select the window containing the video by excluding the static visual elements in the video playback session; determine a blurriness score associated with a potential degradation in quality of the video playing in the selected window; and provide the blurriness score for analysis.

Example 20

The non-transitory computer-readable medium of example 19, wherein the one or more computer-executable instructions cause the computing device to detect the window within the screen capture containing the video playing in the video playback session by: scanning each of a plurality of frames in the video for one or more rows of pixels comprising a frame image; calculating, during the scanning of each of the plurality of frames, a motion vector value associated with each of the pixels; determining that the motion vector value is above a threshold value; recording a row value for each of the plurality of frames based on the motion vector value; sorting each recorded row value for the plurality of frames as a series of integer values; and selecting a median value from the series of integer values corresponding to a starting location of a rectangular area comprising the window within the screen capture containing the video.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, by a computing device and from a video streaming service, a screen capture of a video playback session comprising one or more static visual elements and a video playing in the video playback session;
detecting, by the computing device, a window within the screen capture containing the video playing in the video playback session;
selecting, by the computing device, the window containing the video by excluding the static visual elements in the video playback session;
determining, by the computing device, a blurriness score associated with a potential degradation in quality of the video playing in the selected window; and
providing, by the computing device, the blurriness score for analysis.

2. The computer-implemented method of claim 1, wherein detecting the window within the screen capture containing the video playing in the video playback session comprises:
scanning each of a plurality of frames in the video for one or more rows of pixels comprising a frame image;
calculating, during the scanning of each of the plurality of frames, a motion vector value associated with each of the pixels;
determining that the motion vector value is above a threshold value;
recording a row value for each of the plurality of frames based on the motion vector value;
sorting each recorded row value for the plurality of frames as a series of integer values; and
selecting a median value from the series of integer values corresponding to a starting location of a rectangular area comprising the window within the screen capture containing the video.

3. The computer-implemented method of claim 2, further comprising discontinuing the scanning of each of the plurality of frames upon determining that the motion vector value is above the threshold value.

4. The computer-implemented method of claim 2, wherein calculating the motion vector value associated with each of the pixels comprises:
calculating a length of a motion vector associated with each of the pixels; and
determining the motion vector value based on the length.

5. The computer-implemented method of claim 1, wherein selecting the window containing the video comprises cropping an area in the screen capture containing the static visual elements.

6. The computer-implemented method of claim 1, wherein determining the blurriness score comprises:
detecting an average edge thickness for a plurality of frames in the video playing in the selected window; and
assigning a value representing the blurriness score for the video based on the average edge thickness.

7. The computer-implemented method of claim 6, wherein detecting the average edge thickness for the plurality of frames in the video playing in the selected window comprises:
detecting a target edge for each of the plurality of frames;
determining a thickness of the detected target edge;
detecting another target edge for each of the plurality of frames;
determining a thickness of the another detected target edge; and
averaging the thickness of at least the detected target edge and the thickness of the another detected target edge to detect the average edge thickness.

8. The computer-implemented method of claim 1, wherein the analysis comprises:
comparing the blurriness score to a previously detected blurriness score for the video from a video playback session on another video streaming service; and
determining, based on the blurriness score, that the video in the video playback session on the video streaming service has a lower pixel quality than the video in the video playback session on the another video streaming service.

9. The computer-implemented method of claim 1, wherein the one or more static visual elements comprises one or more user interface elements displayed in the video playback session when the video is playing in a non-fullscreen mode on the video streaming service.

10. A system comprising:
at least one physical processor;
physical memory comprising computer-executable instructions that, when executed by the physical processor, cause the physical processor to:
receive, by a receiving module stored in the memory, screen capture of a video playback session from a video streaming service, the screen capture comprising one or more static visual elements and a video playing in the video playback session;
detect, by a detection module stored in the memory, a window within the screen capture containing the video playing in the video playback session;
select, by a selection module stored in the memory, the window containing the video by excluding the static visual elements in the video playback session;
determine, by a determining module stored in the memory, a blurriness score associated with a potential degradation in quality of the video playing in the selected window; and
provide, by an analysis module stored in the memory, the blurriness score for analysis.

11. The system of claim 10, wherein the detection module detects the window within the screen capture containing the video playing in the video playback session by:
scanning each of a plurality of frames in the video for one or more rows of pixels comprising a frame image;
calculating, during the scanning of each of the plurality of frames, a motion vector value associated with each of the pixels;
determining that the motion vector value is above a threshold value;
recording a row value for each of the plurality of frames based on the motion vector value;
sorting each recorded row value for the plurality of frames as a series of integer values; and
selecting a median value from the series of integer values corresponding to a starting location of a rectangular area comprising the window within the screen capture containing the video.

12. The system of claim 11, wherein the detection module further detects the window within the screen capture containing the video playing in the video playback session by discontinuing the scanning of each of the plurality of frames upon determining that the motion vector value is above the threshold value.

13. The system of claim 11, wherein the detection module calculates the motion vector value associated with each of the pixels by:
  calculating a length of a motion vector associated with each of the pixels; and
  determining the motion vector value based on the length.

14. The system of claim 10, wherein the selection module selects the window containing the video by cropping an area in the screen capture containing the static visual elements.

15. The system of claim 10, wherein the determining module determines the blurriness score by:
  detecting an average edge thickness for a plurality of frames in the video playing in the selected window; and
  assigning a value representing the blurriness score for the video based on the average edge thickness.

16. The system of claim 15, wherein the determining module detects the average edge thickness for the plurality of frames in the video playing in the selected window by:
  detecting a target edge for each of the plurality of frames;
  determining a thickness of the detected target edge;
  detecting another target edge for each of the plurality of frames;
  determining a thickness of the another detected target edge; and
  averaging the thickness of at least the detected target edge and the thickness of the another detected target edge to detect the average edge thickness.

17. The system of claim 10, wherein the analysis comprises:
  comparing the blurriness score to a previously detected blurriness score for the video from a video playback session on another video streaming service; and
  determining, based on the blurriness score, that the video in the video playback session on the video streaming service has a lower pixel quality than the video in the video playback session on the another video streaming service.

18. The system of claim 10, wherein the one or more static visual elements comprises one or more user interface elements displayed in the video playback session when the video is playing in a non-fullscreen mode on the video streaming service.

19. A non-transitory computer-readable medium comprising one or more computer-executable instructions that, when executed by at least one processor of a computing device, cause the computing device to:
  receive, from a video streaming service, a screen capture of a video playback session comprising one or more static visual elements and a video playing in the video playback session;
  detect a window within the screen capture containing the video playing in the video playback session;
  select the window containing the video by excluding the static visual elements in the video playback session;
  determine a blurriness score associated with a potential degradation in quality of the video playing in the selected window; and
  provide the blurriness score for analysis.

20. The non-transitory computer-readable medium of claim 19, wherein the one or more computer-executable instructions cause the computing device to detect the window within the screen capture containing the video playing in the video playback session by:
  scanning each of a plurality of frames in the video for one or more rows of pixels comprising a frame image;
  calculating, during the scanning of each of the plurality of frames, a motion vector value associated with each of the pixels;
  determining that the motion vector value is above a threshold value;
  recording a row value for each of the plurality of frames based on the motion vector value;
  sorting each recorded row value for the plurality of frames as a series of integer values; and
  selecting a median value from the series of integer values corresponding to a starting location of a rectangular area comprising the window within the screen capture containing the video.

* * * * *